John E. Eckel
INVENTOR.

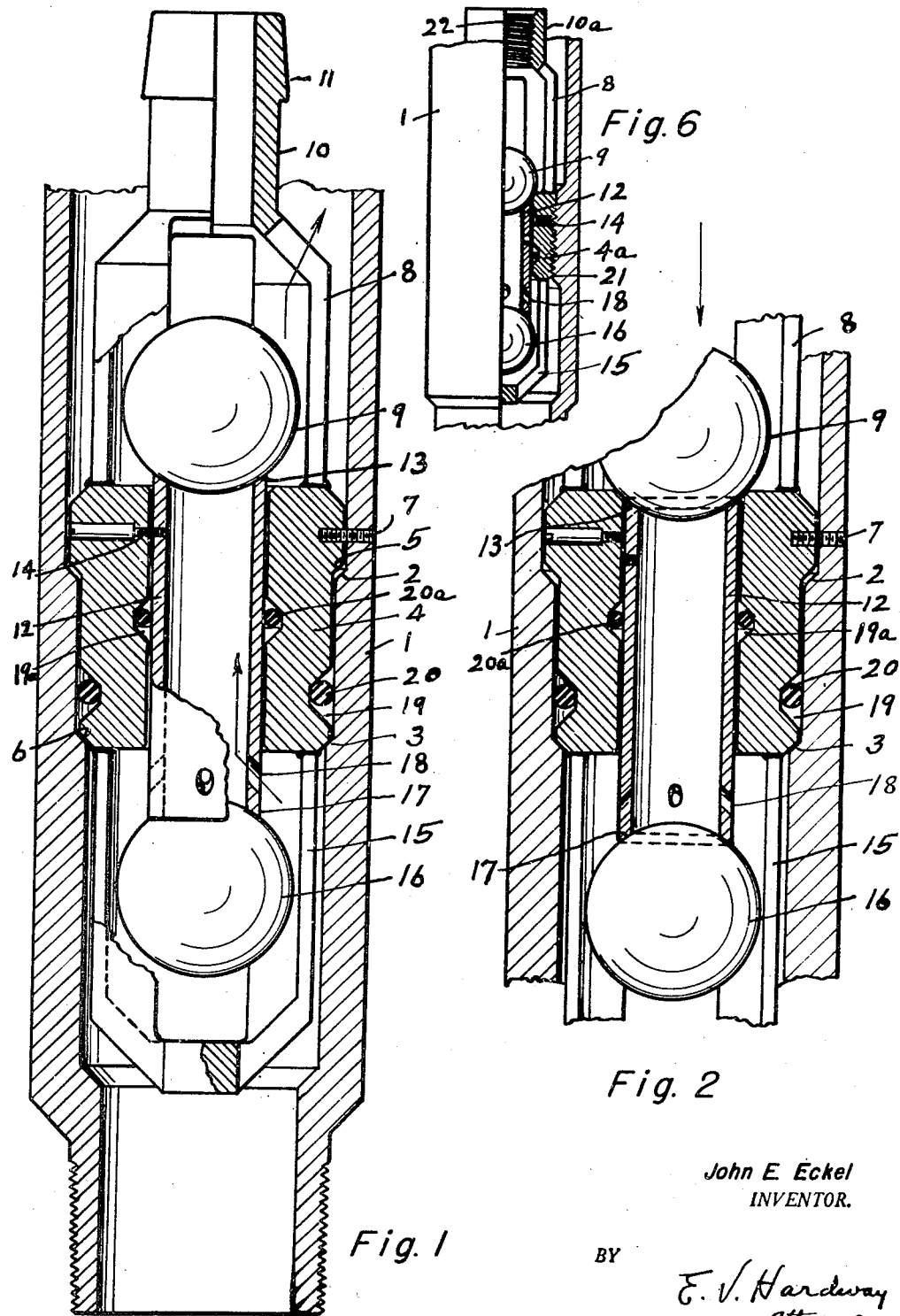

Patented June 1, 1948

2,442,642

UNITED STATES PATENT OFFICE 2,442,642

DOUBLE-ACTING VALVE ASSEMBLY

John E. Eckel, Houston, Tex.

Application June 27, 1946, Serial No. 679,716

1 Claim. (Cl. 277—42)

This invention relates to a double acting valve assembly.

An object of the invention is to provide an assembly of the character specially designed for controlling the flow of liquid through a pipe in a well and which, when in one position, will allow well liquid to enter the pipe while the pipe is being lowered but will close the pipe against the outlet of such liquid and when in another position will prevent the entrance of well liquid into the pipe.

The valve assembly has been particularly designed for use in certain types of packer setting equipment although it is capable of general use for controlling the flow of liquid through the well pipe.

Other objects and advantages will be apparent from the following specification which is illustrated by the accompanying drawings, wherein:

Figure 1 is a vertical, sectional view illustrating the assembly in position to allow the entrance of fluid into the well pipe.

Figure 2 is a fragmentary, vertical, sectional view illustrating the assembly as being converted by pressure within the pipe into a back pressure valve assembly to prevent entrance of the well liquid into the pipe.

Figure 6 is a side elevation, partly in section, of another embodiment of the assembly.

Figure 3:
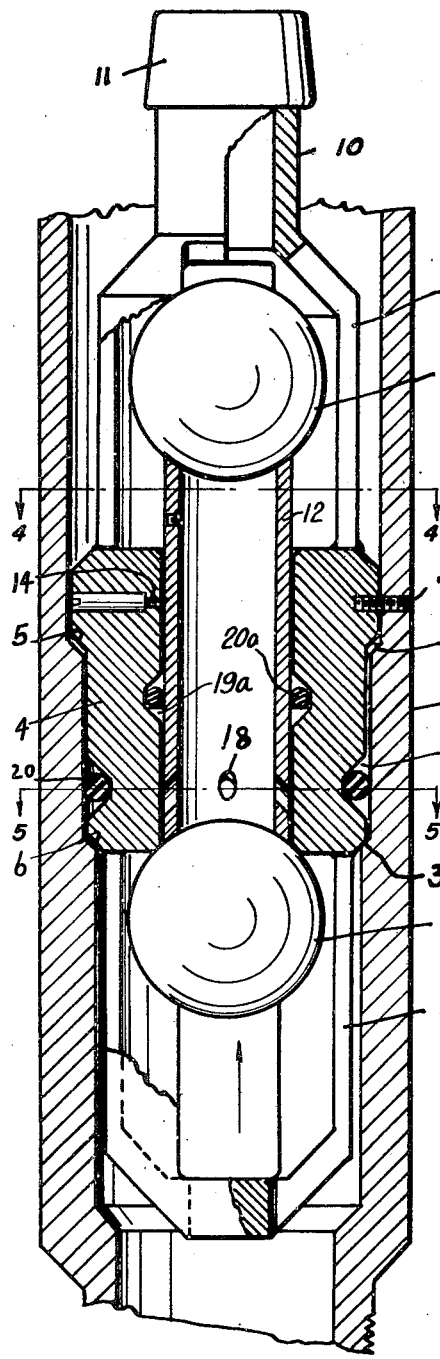
Figure 3 is a vertical, sectional view illustrating the assembly acting as a back pressure valve.
Figure 4:
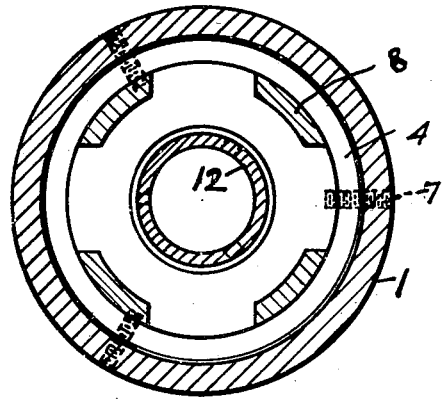
Figure 4 is a cross-sectional view taken on the line 4—4 of Figure 3.
Figure 5:
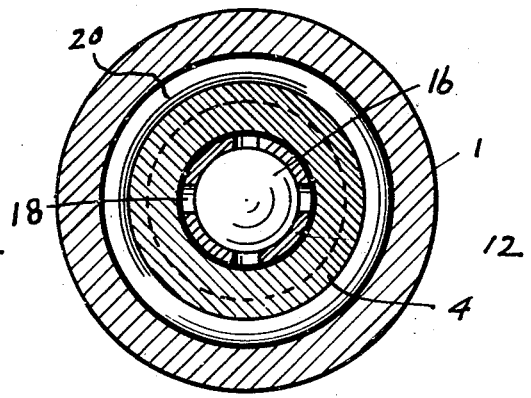
Figure 5 is a cross-sectional view taken on the line 5—5 of Figure 3.

Referring now more particularly to the drawings wherein like numerals of reference designate the same parts in each of the figures, the numeral 1 designates a well pipe adapted to be lowered into a well and, in the present illustration, this well pipe is shown with inside, downwardly converging, upper and lower seats 2 and 3.

In the embodiment illustrated in Figures 1 to 5, inclusive, there is an inside, tubular bushing 4 having external annular seats 5 and 6 adapted to land on said upper and lower seats, respectively, when the bushing is assembled with the pipe.

The bushing may be secured in the pipe by means of a frangible pin 7.

Secured to and upstanding from the bushing 4 there is a valve cage 8 for confining the upwardly opening ball valve 9. Formed integrally with the upper end of the valve cage 8 there is a tubular neck 10 which terminates in a fishing head 11 at the upper end.

Fitted through the bushing 4 there is a tubular sleeve 12 whose upper end is formed with a valve seat 13 whereon the valve 9 may seat. This sleeve is pinned in the bushing by means of a frangible pin 14 so that the upper end of the sleeve will extend above the bushing and its lower end will extend beneath the bushing. The pin 14 is weaker than the pin 7. Secured to the lower end of the bushing 4 there is depending valve cage 15 which confines the downwardly opening valve 16.

The lower end of the sleeve 12 is formed with the valve seat 17 against which the valve 16 may rest with said valve spaced beneath the lower end of the bushing 4, as shown in Figure 1. The lower end of the sleeve 12 is provided with inlet openings 18 so that as the pipe 1 is lowered into the well, with the sleeve 12 pinned stationary in the bushing 4 the well liquid may enter through the openings 18 and lift the valve 9 and pass out through the cage 8 into the well pipe 1.

As shown in Figures 1, 2 and 3 the bushings 4 and 4a have an external annular groove 19 and an internal annular groove 19a therein wherein there are located the seal rings 20 and 20a, respectively, which form liquid tight seals between the bushing and the pipe 1 and between the bushing and the sleeve 12.

When the pipe 1 has been lowered to the required depth and it is desired to reverse the operation of the valve the liquid in the pipe 1 may be placed under sufficient pressure by pumps at the ground surface to force the valve 9 downwardly shearing the pin 14. The sleeve 12 will then be free and should liquid from beneath attempt to enter the pipe 1 the valve 16 and sleeve 12 will be forced upwardly to the position shown in Figure 3 with said valve seated against the lower end of the bushing so as to close the lower end of the pipe.

After the valve assembly has performed its required function it may become desirable to remove it from the pipe so as to allow liquid to freely flow through the pipe in either direction. In such event a grappling tool may be lowered down through the pipe 1 on a cable and engaged with the head 11 and upon upward pull the pin 7 will shear and the entire assembly may then be withdrawn.

In the embodiment illustrated in Figure 6 the construction is substantially the same as shown in the other figures excepting that the bushing 4a is screwed into the lower end of the pipe 1 by means of left hand threads 21 and the upper end of the cage 8 is formed with a collar 10a having internal right hand threads 22. Otherwise the purpose and construction of the assembly is the same as that shown in the other figures.

When it is desired to remove the assembly of the form shown in Figure 6 a fishing tool may be lowered into the pipe 1 having right hand threads on its lower end and screwed home in the collar 10a and may be then turned further to the right to unscrew the bushing 4a from its threaded connection with said pipe and the assembly then readily withdrawn from the well.

What I claim is:

A valve assembly for controlling the flow of fluid through a pipe, or the like, comprising, a tubular bushing shaped to fit into the pipe and having spaced valve seats, a sleeve fitted through the bushing and seats, upper and lower valve cages secured to the bushing, a valve in each valve cage, means for anchoring the sleeve in the bushing in position to hold both valves unseated, said sleeve having an inlet opening beneath said bushing to allow the flow of fluid upwardly through the sleeve when the sleeve is so anchored, said anchoring means being shearable in response to the pressure of fluid against the upper valve to allow free movement of the sleeve whereby the ends of the sleeve will clear the corresponding seats and the valves will be alternatively seated against their corresponding seats in response to alternative increase of fluid pressure on opposite sides of the assembly.

JOHN E. ECKEL.

REFERENCES CITED

The following references are of record in the file of this patent:

UNITED STATES PATENTS

| Number | Name | Date |
|---|---|---|
| 1,359,593 | Hardt | Nov. 23, 1920 |
| 1,594,168 | Goff | July 27, 1926 |
| 1,601,308 | Hill | Sept. 28, 1926 |
| 2,245,198 | Hunter et al. | June 10, 1941 |

FOREIGN PATENTS

| Number | Country | Date |
|---|---|---|
| 697,026 | France | 1930 |